United States Patent [19]

Miller

[11] Patent Number: 4,780,195
[45] Date of Patent: Oct. 25, 1988

[54] ADDITION OF WATER TO REGENERATION AIR

[75] Inventor: Charles B. Miller, Ashland, Ky.

[73] Assignee: Ashland Oil, Inc., Ashland, Ky.

[21] Appl. No.: 517,126

[22] Filed: Jul. 25, 1983

[51] Int. Cl.[4] .................. C10G 11/05; C10G 11/18; B01J 21/20; B01J 29/38
[52] U.S. Cl. .................. 208/120; 208/253; 502/43; 502/44
[58] Field of Search .................. 208/113, 120, 253; 502/41, 42, 43, 44, 46, 47, 49, 51, 521

[56] References Cited

U.S. PATENT DOCUMENTS

| | | | |
|---|---|---|---|
| 2,394,710 | 2/1946 | McAfee | 208/118 |
| 2,788,311 | 4/1957 | Howard et al. | 502/44 |
| 3,161,583 | 12/1964 | Pohlenz | 208/164 |
| 3,303,123 | 2/1967 | Payton et al. | 208/74 |
| 3,661,799 | 5/1972 | Cartmell | 502/43 |
| 3,696,025 | 10/1972 | Chessmore et al. | 208/113 |
| 3,902,990 | 9/1975 | Luckenbach | 208/164 |
| 3,909,392 | 4/1975 | Horecky, Jr. et al. | 208/120 |
| 4,137,152 | 1/1979 | Chester et al. | 208/120 |
| 4,260,475 | 4/1981 | Scott | 208/113 |
| 4,332,674 | 6/1982 | Dean et al. | 208/120 |
| 4,367,136 | 1/1983 | McKay | 208/120 |
| 4,370,220 | 1/1983 | Bearden et al. | 208/108 |
| 4,388,218 | 6/1983 | Rowe | 208/50 X |
| 4,405,445 | 9/1983 | Kovach et al. | 208/120 |
| 4,454,026 | 6/1984 | Hensley, Jr. et al. | 502/322 |

Primary Examiner—Olik Chaudhuri
Attorney, Agent, or Firm—Richard C. Willson, Jr.; James L. Wilson

[57] ABSTRACT

The invention is particularly concerned with controlling the two stage regeneration temperatures of the RCC residual oil cracking unit below 760° C. (1400° F.) by effecting a first stage regeneration with direct injection of water in an oxygen lean atmosphere to product CO rich flue gases under temperature conditions restricted not to substantially exceed 732° C. (1350° F.) preferably less than 732° C. (1350° F.) thereby partially regenerating the catalyst. The partially regenerated catalyst is withdrawn and directly cooled with boiler feed water to produce steam in an external catalyst cooler before passing the catalyst to a second stage catalyst regeneration for contact with an oxygen rich atmosphere restricted not to exceed 760° C. (1400° F.) and preferably maintain less than 760° C. (1400° F.). The catalyst regenerated by this technique comprising residual coke less than 0.25 wt % is passed to a riser conversion zone for catalytic cracking residual oil feeds.

7 Claims, 1 Drawing Sheet

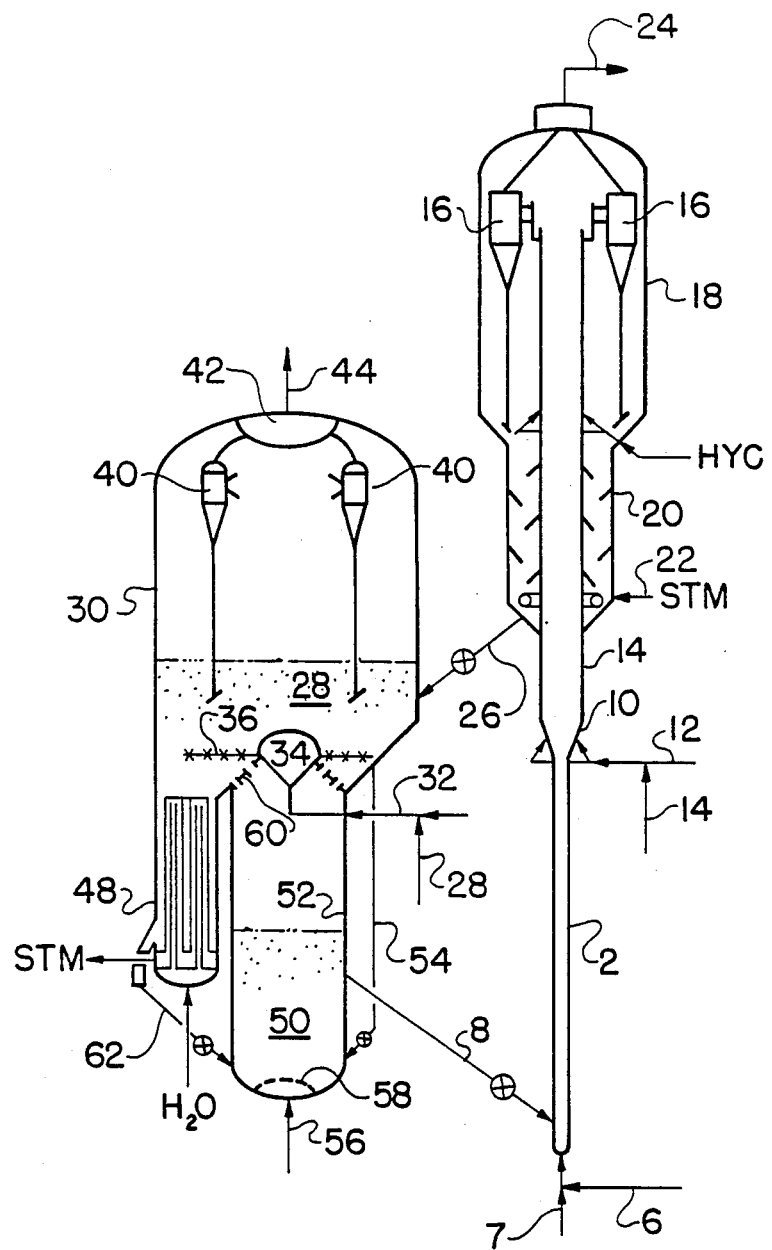

ADDITION OF WATER TO REGENERATION AIR

CROSS REFERENCES TO RELATED APPLICATIONS

U.S. Ser. No. 251,032 filed 4/3/81, U.S. Ser. No. 369,861 filed 4/19/82 and U.S. Ser. No. 369,860 filed 4/19/82 relate to the general field of the invention.

BACKGROUND OF THE INVENTION

1. Field of the Invention

This invention relates to converting heavy hydrocarbon oils such as topped crudes and heavy residual oils into lower boiling fractions. The invention relates to converting heavy hydrocarbons containing concentrations of Conradson carbon coke precursors and metal contaminants to form gasoline and other liquid hydrocarbon fuels and effect temperature restrained regeneration of catalyst particles thus used.

2. Description of the Prior Art

In general, gasoline and other liquid hydrocarbon fuels boil in the range of about 38° C. to about 343° C. (100° to about 650° F.). However, the crude oil from which these fuels are made contains a diverse mixture of hydrocarbons and other compounds which vary widely in molecular weight and therefore boil over a wide range. For example, crude oils are known in which 30 to 60% or more of the toal volume of oil is composed of compounds boiling at temperatures above 343° C. (650° F.). Among these are crudes in which about 10% to about 30% or more of the total volume consists of polycyclic compounds so heavy in molecular weight that they boil above 552° C. (1025° F.) or at least will not boil below 552° C. (1025° F.) at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate lower boiling range. The cracking process which is most widely used for this purpose is known as fluid catalyst cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes. Among these troublesome materials are coke precursors (such as asphaltenes, polynuclear aromatics, etc.), heavy metals (such as nickel, vanadium, iron, copper, etc.), lighter metals (such as sodium, potassium, etc.,), sulfur, nitrogen and others. Certain of these, such as the lighter metals, can be removed by desalting operations, which are part of the normal procedure for pretreating crude oil for fluid catalytic cracking. Other materials, such as coke precursors, asphaltenes, porphyrins and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or its catalytic effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, are considered "poison" to the catalyst. They tend in varying degrees to promote excessive dehydrogenation and aromatic condensation, resulting in excessive production of carbon and gases with consequent impairment of liquid fuel yield. A crude oil and residual fractions of crude oil or other heavy oil sources that are particularly abundant in these metal contaminants exhibit similar behavior. Such heavy oil fractions which comprise relatively large quantities of coke precursors, asphaltenes and porphyrins are referred to as metallo-organic or carbo-metallic compound containing oils and represent a particular challenge for upgrading by the petroleum refiner.

In general, the coke-forming tendency or coke precursor content of an oil fraction can be ascertained by determining the weight percent of carbon remaining after a sample of that oil has been pyrolyzed. In conventional FCC practice, Conradson carbon values on the order of about 0.05 to about 1.0 are regarded as indicative of acceptable feed. The present invention is particularly concerned with the conversion of petroleum hydrocarbon feedstocks and residual portions thereof which provide greater than 1, up to about 12 or 14 Conradson carbon values and thus exhibit substantially greater potential for coke formation than lower boiling gas oil feeds.

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this and which therefore have a significantly greater potential for accumulating on and poisoning catalyst.

In the conventional FCC practice, in which a circulating inventory of catalyst is used agains and again in the processing of fresh feed, with periodic or continuing minor addition and withdrawal of fresh and spent catalyst, the metal content of the catalyst is maintained at a level which may, for example, be in the range of about 200 to about 600 ppm Nickel Equivalents. This process of the present invention is concerned with the use of catalyst having a substantial metals content in the range of 6,000 to 12,000 or more ppm of Ni+V and which therefore has a much greater than normal tendency to promote dehydrogenation, aromatic condensation, gas production or coke formation. Such high metals accumulation is normally regarded as quite undesirable in FCC gas oil processing.

There has been a long standing interest in the conversion of carbo-metallic oils into gasoline and other liquid fuels. Several proposals involve treating the heavy oil feed to remove the metal therefrom prior to cracking, such as by hydrotreating, solvent extraction, decarbonizing and demetallizing with relatively inert solids, complexing with Friedel-Crafts catalysts and combinations thereof, but these techniques have been criticized as unjustified economically. Another proposal employs a combination of cracking process having "dirty oil" and "clean oil" units. Still another proposal blends residual oil with gas oil and controls the quantity of residual oil in the mixture in relation to the equilibrium flash vaporization temperature at the bottom of a riser hydrocarbon conversion zone employed in the process. Still another proposal subjects the feed to a mild preliminary hydrocracking or hydrotreating operation before it is introduced into the cracking unit. It has also been suggested to contact a carbo-metallic containing oil feed such as residual or reduced crude oils with hot taconite pellets to produce gasoline. This is a small sampling of the many proposals which have appeared in the patent literature and technical reports.

It has been possible heretofore to largely avoid the problems of coke precursors and heavy metals by sacrificing the liquid fuel yield which would be potentially available from the highest boiling fractions. More particularly, a more conventional gas oil FCC practice has employed as feedstock that fraction of crude oil which boils in the range of at about 538° C. (650° F. to about 1000° F.). Such fractions are relatively free of Conradson carbon coke precursors and heavy metal contamination. Such feedstock, known as "vacuum gas oil" (VGO), is generally prepared from crude oil by distilling off the fractions boiling below about 343° C. (650° F.) at atmospheric pressure and then separating the 343° C. (650° F.) plus fraction by vacuum distillation from the heavier resid fraction as vacuum gas oil boiling between about 343° C. up to about 482° C. or 552° C. (650° F. up to about 900° F. or 1025° F.).

The vacuum gas oil plus atmospheric gas oils is used as feedstock in conventional FCC processing to particularly produce high yields of gasoline. The heavier resid fraction of vacuum distillation is normally employed for a variety of other purposes, such as for instance the production of asphalt, #6 fuel oil, or marine Bunker C fuel oil. The present invention is concerned with effecting the simultaneous cracking of these heavier oil fractions containing substantial quantities of both coke precursors and heavy metals contaminants and possibly other troublesome components, in conjunction with converting the lighter gas oil fractions to desired gasoline product thereby increasing the overall yield of gasoline and other hydrocarbon liquid fuels from a given quantity of crude oil.

The oil feeds capable of being cracked by the method of this invention are carbo-metallic oils of which at least about 70 percent thereof boils above 343° C. (650° F.) and contains a carbon residue on pyrolysis of at least about 1 and at least about 4 parts per million of nickel equivalents of heavy metals. Examples of these oil feeds are crude oils, topped crudes, residual or reduced crudes, residua, and extracts from solvent deasphalting.

The unusually large amount of coke which deposits on the catalyst in carbo-metallic oil processing presents critical problems, the primary problem arising from the fact that the reactions in the regenerator which convert coke to water, carbon monoxide and carbon dioxide are highly exothermic. Using a carbo-metallic feed with its unusually high content of coke precursors as compared to gas oil FCC feeds, can substantially increase the amount of coke to be burned in the regenerator and thus the regeneration temperatures can become excessive in the absence of appropriate control if there is thorough burning of deposited coke. Excessive regeneration temperatures can permanently deactivate the catalyst and/or damage the regenerating equipment.

The heat of combustion of coke depends in part upon the concentration of hydrogen in the coke or carbonaceous deposit and the ratio of $CO_2$ to CO obtained in the products of combustion. Carbon produces 13,910 BTU per pound of heat when burned to $CO_2$ and only 3,962 BTU per pound when burned to CO. Hydrogen produces 61,485 BTU per pound of heat when burned to $H_2O$. The heats of combustion of coke for three representative levels of hydrogen and four different ratios of $CO_2/CO$ are given in the following table:

TABLE 1

| | Heat of Combustion BTU/lb Coke | | |
|---|---|---|---|
| | Percent Hydrogen | | |
| $CO_2/CO$ Ratio | 2 | 4 | 6 |
| 0.5 | 8,362 | 9,472 | 10,582 |
| 1.0 | | 11,472 | 12,083 |
| 3.0 | | | 14,446 |
| 4.0 | 12,912 | | 14,894 |

The problems encountered in regenerating catalysts coated with a high concentration of hydrocarbonaceous material may be aggrevated when catalysts of the crystalline zeolite or molecular sieve type are used. These catalysts, which comprise crystalline aluminosilicates made up of tetra-coordinated aluminum atoms associated through oxygen atoms with silicon atoms in the crystalline structure, are susceptible to loss of cracking activity upon extended exposure to high temperatures particularly in the presence of steam.

Various methods have been suggested and used to control the temperature in the regeneration zone including cooling by heat exchangers external to the regenerator (see U.S. Pat. No. 2,394,710), cooling by injection steam or water into the dense catalyst bed or an upper dilute phase thereabove in a regenerator (see U.S. Pat. Nos. 3,303,123 and 3,909,392), and controlling the amount of oxygen preent (see U.S. Pat. No. 3,161,583).

SUMMARY OF THE INVENTION

An object of this invention is to provide a method for converting carbo-metallic containing residual oils to liquid fuels and effect regeneration of the catalyst under restrained temperature conditions.

Another object is to provide a carbo-metallic containing residual oil conversion process involving controlling the regeneration temperatures in response to hydrocarbon conversion requirements in a riser reactor.

In a more particular aspect, a carbo-metallic oil conversion process of restricted operating temperature and heat balance is provided wherein the temperature within a sequentially arranged two stage catalyst system is controlled not to exceed about 760° C. (1400° F.) by a combination of direct liquid water injection into a first catalyst bed and effecting substantial indirect cooling of partially regenerated catalyst charged to a second catalyst bed stage of regeneration so that combustion products thereof may be used effectively when passed in contact with catalyst being regenerated in the first stage regeneration operation.

The present invention is directed to a highly productive approach to the catalyst conversion of carbo-metallic containing residual oil feeds such as a reduced crude or the like to produce lighter products such as gasoline and liquid cycle oils. The carbo-metallic containing heavy oil comprises vacuum gas oil materials which boil above about 343° C. (650° F.) and is further characterized by a heavy metal content of at least about 4, and more usually at least about 5.5 ppm of Nickel Equivalents by weight. Such residual oils may produce a carbon residue on pyrolysis of at least about 1% and more usually at least about 2% by weight.

The carbo-metallic containing oil feed referred to herein as residual oils, residual portions of crude oils, reduced crudes and topped crudes include sweet and sour crudes of little or substantial Conradson carbon producing components generally in excess of a value of 2 and boiling above about 538° C. or 552° C. (1000° F. or 1025° F.). A low metals containing residual portion of some crudes contemplated to be processed in the combination operation of this invention comprise an API gravity within the range of 26 to about 30 API. Such residual oils may comprise from about 1 to about 20 ppm of Ni plus V. On the other hand, a heavy residual oil feed of API gravity within the range of 15 to 25 may comprise a Ransbottom carbon value in the range of 6 to 8 and from about 70 to about 100 ppm of total metals.

In accordance with one aspect of the invention, a carbo-metallic heavy oil feed is brought into contact with a regenerated conversion catalyst of restricted temperature level in a weight ratio of catalyst to feed in the range of about 5 to about 10. The heavy residual oil feed is mixed with the regenerated catalyst particles to form a relatively dilute high temperature suspension which affects desired catalytic conversion of the feed to form lower boiling vaporous products and hydrocarbonaceous deposits as the mixture flows through a progressive flow or riser type reaction zone. The oil feed, catalyst, and fluidizing dispersant materials for the catalyst and heavy oil feed may be introduced together or at one or more vertically spaced apart points to the riser reaction zone. The resultant suspension products of hydrocarbon conversion and catalyst initially formed at a temperature less than about 760° C. (1400° F.) are maintained as an upflowing suspension in contact with one another as a relatively dispersed catalyst phase suspension passed through the riser reactor for a residence time selected within the range of about 0.5 up to about 5 seconds and preferably less than 3 seconds within the riser.

The heavy oil conversion reaction is effected at a temperature providing a riser outlet temperature of about 482° C. (900° F.) up to about 538° C. or 566° C. (1000° F. or 1050° F.) under a total pressure above atmospheric pressure up to about 50 psig or more and sufficient severe to provide a conversion per pass of at least about 50% up to about 70%. Hydrocarbonaceous materials laid down on the catalyst identified as coke in an amount in the range of about 2% up to about 12% by weight and more usually at least about 4 wt %.

At the end of a predetermined riser hydrocarbon conversion vapor residence time, the catalyst is separated from vapor conversion products, and stripped to remove entrained vaporous hydrocarbons. The stripped catalyst is then regenerated under conditions of time, temperature and oxygen concentration as herein provided and sufficient to reduce the carbon on the regenerated catalyst to about 0.25% or less and preferably to at least about 0.1 percent by weight without exceeding a temperature within the range of 732° to 760° C. (1350° to 1440° F.).

The hydrocarbon conversion operation of this invention is concerned particularly with controlling the heat balance of a residual oil catalytic conversion operation and regeneration of catalyst particles used therein to remove substantial deposits of hydrocarbonaceous material from the catalyst particles under conditions minimizing hydrothermal degradation of catalyst particles. More particularly the present invention is concerned with maintaining a selective catalyst regeneration operation comprising two sequentially arranged fluid catalyst beds operationally separated as herein provided. That is, in a first stage of catalyst particle regeneration a major portion of hydrocarbonaceous deposits on the catalyst up to about 75% or more is removed in an oxygen lean temperature restricted atmosphere not exceeding about 760° C. (1400° F.) under conditions to produce CO rich flue gases. The temperature environment is substantially restricted by the combination comprising the addition of water directly to the catalyst bed either separately and/or with an oxygen lean regeneration gas charged thereto. The catalyst particles thus partially regenerated in the temperature restricted atmosphere and comprising residual coke thereon is withdrawn from the first stage of regeneration, cooled to a desired lower temperature in an indirect heat exchange zone with boiler feed water to produce high temperature steam. The catalyst thus indirectly cooled is then charged to a separate second fluid bed of catalyst being regenerated and maintained under oxidizing conditions sufficient to remove residual carbon to a desired lower level of at least 0.25 wt % in a temperature restricted atmosphere not exceeding about 815° C. (1500° F.) or less with moisture free or dry oxygen containing gas sufficient to produce $CO_2$ rich flue gases comprising some unconsumed oxygen.

The cooperative consumption and generation of heat in the temperature restricted combination operation for a residual oil hydrocarbon conversion and catalyst regeneration sequence herein identified synergistically contribute to a heat balanced operation which substantially extends the employed catalyst on stream life in producing gasoline boiling range products, gasoline precursors and cycle oils. That is the catalyst employed and circulated in the system is protected to minimize high temperature hydrothermal deactivation thereof during regeneration following the conversion of heavy oil feeds producing substantial carbonaceous deposits of Conradson carbon.

Those skilled in the art will recognize that the cooperative heat balanced operation of the invention relies in substantial measure upon the composition of a residual oil being catalytically cracked, the catalyst employed, the catalyst regeneration sequence employed and upon the catalyst circulation rate. It is well established that a high catalyst circulation rate makes more coke to be removed by combustion during catalyst regeneration. Furthermore, the combustion removal of high levels of coke deposition contributes to high temperatures unless special precautions are taken in a given operating system. The processing of residual oils and residual crudes comprising Conradson carbon contributing materials boiling about 552° C. (1025° F.) in any significant quantity aggravates the combination operation with respect to heat production and disposal. Therefore, according to this invention it is considered particularly essential to employ a relatively low catalyst circulation rate provided by relatively low catalyst to oil ratios less than 10 and maintained within the limited operating temperature conditions herein identified. The combination operation herein defined is controlled in substantial measure by the temperature restriction maintained in a first stage of catalyst regeneration during removal of up to about 75 wt % or more of the deposited carbonaceous material in an oxygen lean atmosphere providing CO rich flue gases, steam, oxides of sulfur and nitrogen and some $CO_2$. It is also essential to the catalyst regeneration concepts of this invention when cascading hot $CO_2$ rich flue gases comprising oxygen from the second stage directly to the first stage of catalyst regeneration that the first stage of regeneration must be equal to or preferably cooler than the second stage of catalyst regeneration. The catalyst cascaded from the first stage to the second stage of catalyst regeneration is cooled substantially prior to contact with oxygen rich gas in the second stage of catalyst regeneration sufficient to remove residual carbonaceous material or coke to a desired residual level below 0.25 weight percent and yet maintain the ultimate catalyst particles regeneration temperature below about 815° C. (1500° F.) and preferably from about 732° C. to 760° C. (1350° F. to 1400° F.) for cascade to the hydrocarbon conversion zone.

The heat balanced combination operation herein identified relies in substantial measure upon using a low catalyst circulation rate and substantial restriction of catalyst regeneration temperatures during removal of a major portion of deposited hydrocarbonaceous materials by the direct injection of liquid water into the catalyst bed of the first stage of restricted oxygen concentration regeneration. Cooling of the combination regeneration operation is achieved in substantial measure by direct injection of water into the upper dense fluid bed of catalyst wherein the heat generated is utilized as latent heat of vaporization for the charged water and as sensible heat with respect to formed steamed in raising the temperature thereof.

BRIEF DESCRIPTION OF THE DRAWING

The drawing is a diagrammatic sketch in elevation of an arrangement of apparatus comprising two stages of catalyst regeneration positioned adjacent to a riser cracking zone and suitable for practicing the concepts of the present invention.

DISCUSSION OF SPECIFIC EMBODIMENTS

The present invention provides a process for the continuous catalytic conversion of a wide variety of carbo-metallic residual oils to form lower molecular weight products comprising highly valuable liquid products. The invention is applicable to processing carbo-metallic oils, particularly of petroleum origin. The invention is concerned with processing widely diverse materials such as heavy bottoms from crude oil, heavy bitumen crude oil, crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, clop oils, and mixtures of the foregoing.

The heavy oil feeds contemplated for use in the process of this invention comprises carbo-metallic residual oil components which provide a carbon residue on pyrolysis of at least about 2. For example, the Conradson carbon content may be in the range of about 2 to about 12 and most usually is from about 4 to about 8 Conradson carbon. The residual oil feeds having a Conradson carbon content greater or less than about 4 are beneficially processed to desired liquid fuel products following the combination of processing concepts of this invention.

The carbo-metallic feeds employed in the cracking process of this invention, or at least the 343° C. + (650° F. +) material therein, most usually contains at least about 4 parts per million of Nickel Equivalents of which either Nickel or Vanadium is in major proportion. Carbo-metallic residual oils with the above range of metal contaminants can be prepared from mixtures of two or more portions of different crude oils.

The cabo-metallic heavy oil feeds also contain significant quantities of compounds containing nitrogen, a substantial portion of which may be basic nitrogen. For example, the total nitrogen content of a carbo-metallic residual oil may be at least about 0.05% by weight. Since cracking catalyst owe their cracking activity to acid sites on the catalyst surface or in its pores, basic nitrogen-containing compounds may temporarily neutralize these sites, poisoning the catalyst. However, the catalyst is not permanently damaged since the nitrogen accumulated with the coke on the catalyst is removed by combusting coke during regeneration, as a result of which the acidity of the active catalyst cracking sites is substantially restored.

Alkali and alkaline earth metals generally do not tend to vaporize in large quantities under the distallation conditions employed in distilling crude oil to obtain vacuum gas oils normally used as FCC feedstocks. Rather, these metals remain for the most part in the "bottoms" fraction (the non-vaporized high boiling portion) which is often used in the production of asphalt or other by-products. Thus, a reduced crude and other carbo-metallic heavy oils which include the bottom high boiling portion of the crude therefore contains significant quantities of alkali and alkaline earth metals such as sodium. These metals deposit upon the catalyst during the cracking operation. Depending on the compostion of the catalyst and the magnitude of the regeneration temperatures to which it is exposed, these deposited metals undergo some interactions and reactions with the catalyst and thus alter its activity-selectivity conversion characteristics which are experienced to a lesser extent in processing gas oils under the more conventional FCC processing conditions. If the catalyst characteristics and regeneration conditions so require, one will of course take the necessary precautions to limit the amount of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed is important since cracking catalysts are particularly susceptible to alkali and alkaline earth metals. The contents of such metals and particularly sodium in the feed is maintained at about 1 ppm or less, based on the weight of the feedstock.

Although there is no intention of excluding the possibility of using a feedstock which has previously been subjected to some thermal cracking to achieve some decarbonization and contaminant metals removal it can be successfully used to improve the cracking catalyst life and selectivity to produce very substantial yields of desired liquid hydrocarbon fuels. The carbo-metallic residual oil feed converted as herein provided may be a feed which has not previously been contacted with deactivated catalyst or relatively inert solids under elevated temperature restricted thermal cracking conditions. The process of the invention is suitable for operation in a substantially once-through or single pass mode of the residual oil feed.

In general, the weight ratio of catalyst to fresh heavy residual oil feed used in the process is in the range of about 3 to about 12 and preferably the ratio is from about 4 to about 10. Thus controlling the catalyst to oil ratio at relatively low levels within the aforesaid ranges tends to reduce the coke yield of the process, based on fresh feed.

In the practice of the invention, catalyst may be added continuously or periodically, such as, for example, to maintain desired equilibrium catalyst and to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, and more preferably from about 0.15 to about 2 pounds per barrel.

The equilibrium catalyst concentration of heavy metals in the circulating inventory of catalyst is controlled by manipulation of the rate of catalyst addition. Thus, for example, the addition of catalyst may be maintained at a rate which will control the heavy metals accumulation on the catalyst within the range set forth above.

In general, it is preferred to employ a catalyst having a dual function catalystic cracking activity contributed by the crystalline zeolite component thereof and the matrix composition of the catalyst particle to achieve relatively high desired levels of conversion to desired products at low residence conversion time. The conversion capabilities of the catalyst may be expressed in terms of the 204° C. (400° F.) minus conversion product produced during operation of the process. It is preferred to employ catalyst particles which, in the course of extended operation in the process, is sufficiently active for sutaining a level of conversion of at least about 50% and more preferably at least about 60%.

The crystalline zeolite containing cracking catalyst is initially introduced into the process in its virgin form as prepared. One may use, however, an equilibrium catalyst withdrawn from another unit, such as a catalyst that has been employed in the cracking of a different feed. When characterized on the basis of MAT activity, a preferred MAT activity for virgin and non-virgin catalyst introduced into the process of the present invention is at least about 60%, but it will be appreciated that a lower MAT activity level may be employed.

The zeolite-containing catalysts may include a zeolite, whether natural, semi-synthetic or synthetic, alone or in admixture with other catalytic materials which do not significantly impair the suitability of the catalyst, provided the resultant catalyst has the activity and pore structure desired. For example, if the catalyst is a mixture, it may include the zeolite component associated with or dispersed in a porous refractory inorganic oxide carrier. In such case the catalyst may for example contain from about 5 to about 40 weight percent of the zeolite but preferably the zeolite component is usually from about 5 to about 20% by weight and more usually not above about 15 weight percent based on the total weight of catalyst (water free basis) of the zeolite. The balance of the catalyst composition is preferably an amorphous silica refractory inorganic oxide of high pore volume and high surface area providing substantial cracking activity in combination with any one of the known adjuvants for promoting desired or suppressing undesired encountered reactions during hydrocarbon conversion and catalyst regeneration.

The zeolite component of the preferred zeolite-containing cracking catalyst is a faujasite crystalline zeolite and is known to be useful in FCC cracking processes. In general, such crystalline aluminosilicates are typically made of up tetra coordinated aluminum atoms associated through oxygen atoms with adjacent silicon atoms in the crystal structure. Titanium and/or zirconium combined with silica may be uesd as part of the catalyst composition to provide active cracking sites.

Most zeolites are prepared or occur naturally in the sodium form, so that sodium cations are associated with the electro-negative sites in the crystal structure. The sodium cations tend to make zeolites inactive and much less stable when exposed to hydrocarbon conversion conditions, particularly high temperatures. Accordingly, the zeolite are ion exchanged, and such ion exchanging may occur before or after incorporation of the zeolite component in the catalyst composition. Suitable cations for replacement of sodium in the zeolite crystal structure include ammonia (decomposable to hydrogen), hydrogen, rare earth metals, alkaline earth metals, etc. Various suitable ion exchanged procedures and cations which may be exchanged into the zeolite crystal structure are well known to those skilled in the art.

The crystalline aluminosilicate zeolites having a faujasite-type crystal structure are particularly preferred for preparing catalyst compositions for use in the present invention. This includes natural faujasite, Zeolite X and Zeolite Y with Zeolite "Y" being particularly preferred.

The crystalline aluminosilicate zeolites, such as synthetic faujasite, will under normal conditions crystallize as regularly shaped, discrete particles of about one to about ten microns in size, and, accordingly, this is the size range frequently found in commercial catalyst and used in the catalyst employed in this invention. Preferably, the particle size of the zeolites is from about 0.1 to about 10 microns and more preferably is from about 0.1 to about 5 microns or less. For example, zeolites prepared in situ from calcined kaoline may be characterized by even smaller crystallites. Crystalline zeolites exhibit both an interior and an exterior surface areas, which is defined as "portal" surface area, with the largest portion of the total surface area being internal. By portal surface area, one refers to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination and pore blockage, crystals larger than the normal size cited above are preferably not used in the catalyst of this invention.

Commercial zeolite-containing catalyst available are admixed with carriers or matrix materials containing a variety of metal oxides and combination thereof, including for example silica, alumina, magnesia, clays and mixtures thereof. One may select, for example, one of the zeolite-containing molecular sieve fluid cracking catalysts available in the industry and known as Octex catalyst which are suitable for production of gasoline from vacuum gas oils. Advantages are attained by judicious selection of catalyst having marked resistance to metals. A metals resistant low coke producing zeolite catalyst is identified as one in which the catalyst contains an amount less than 15 weight percent of a stabilized hydrogen "Y" faujasite zeolite, the balance being a catalytically active matrix comprising refractory metal oxides and providing desired pore volume, surface area and pore size distribution. Some catalysts described as "metals-tolerant" catalyst are described in a Cimbalo et al article entitled "Deposited Metals Poison FCC Catalysts", *Oil and Gas Journal*, May 15, 1972, pgs. 112–122.

It is contemplated employing catalysts particles of an overall particle size in the range of about 5 to about 160 microns and preferably one providing an average particle size within the range of 50 to 120 microns.

A catalyst composition which may be employed with considerable success in the combination operation of the invention is as follows. The special fluid catalyst particles comprise from about 5 to 15 weight percent of an active crystalline faujasite zeolite comprising a mixture of a stable hydrogen form and a rare earth metals exchanged form providing a lanthanum to cerium ratio of at least 1/1. The zeolite is dispersed in a siliceous inorganic matrix of high alumina content and preferably comprises an abundance of alumina up to about 40 weight percent. The matrix is prepared under conditions to provide a high surface area material of at least about 190 sq. m/g or more and comprising a pore volume in the range of 0.35 to 0.55 cc/g. The pore size openings of the matrix are distributed over a wide range with at least 35 or more percent thereof being within the range of 400 to 6000 Angstroms. The special catalyst composition may be used alone or if desired in combination with other separate special catalyst particle compositions of rare earth exchanged crystalline zeolite of the same amount, smaller or a larger amount of the zeolite component. In the combination operation of the invention, the special catalyst composition is preferably provided with one or more elements such as titanium, zirconium and antimony to passivate accumulated metal contaminant deposits particularly of nickel and vanadium on the catalyst particles in conjunction with forming acidic cracking sites between silica and Ti or Zr. The passivating metals are added in conjunction with maintaining an equilibrium catalyst replacement rate within the range of 0.5 up to 3 pounds per barrel of oil feed, particularly when the accumulation of nickel has reached a level as high as 2500 or 4000 ppm and the accumulation of nickel plus vanadium is up to 12,000 ppm. Preferably vanadium is restricted to an accumulation within the range of 4000 to 8000 ppm by replacement with catalyst particles of lower metals accumulation and/or passivation thereof with titanium addition.

Analysis of some prepared catalyst composition particularly suitable for use in the processing concepts of the invention are as follows:

TABLE 2

| Elemental Compositions, Wt. % I.B. | | |
|---|---|---|
| | Catalyst A | Catalyst B |
| $SiO_2$ | 44.5 | 45.6 |
| $Al_2O_3$ | 48.7 | 47.4 |
| $TiO_2$ | 1.27 | 1.67 |
| $Fe_2O_3$ | 0.54 | 0.71 |
| $Na_2O$ | 0.87 | 0.73 |
| $La_2O_3$ | 1.12 | 1.00 |
| $CeO_2$ | 0.43 | 0.31 |
| $Nd_2O_3$ (calculated) | 0.45 | 0.36 |

TABLE 2-continued

| $Pr_6O_{11}$ (calculated) | 0.15 | 0.13 |
|---|---|---|
| $Re_2O_3$ total | 2.15 | 1.80 |
| $La_2O_3/CeO_2$ | 2.60 | 3.20 |

| Phase Composition Wt. % I.B. | | |
|---|---|---|
| | "Y" Faujasite | "Y" Faujasite |
| Zeolite Type | | |
| XRD % Intern. Std. | 10 | 8 |
| Kaolinite | 61 | 56 |
| Metakaolinite/Mullite Spinel | 23 | 26 |
| Bayerite/Amorp. Al(OH)$_3$ | 5 | 6 |
| Phase Composition Wt. % I.B. | | |
| Pseudo boehmite | 17 | 11 |
| Anatase (TiO$_2$) | 2 | 2 |
| Hg Pore Size Distribution (%) | | |
| 6000–1000 Angstroms | 12 | 20 |
| 1000–400 Angstroms | 23 | 24 |
| 400–200 Angstroms | 17 | 14 |
| 200–100 Angstroms | 13 | 11 |
| 100–80 Angstroms | 5 | 5 |
| 80–60 Angstroms | 22 | 18 |
| 60 Angstroms | 22 | 18 |

It will be observed from the above analysis that a high silica to alumina matrix cracking catalysts comprising a stable hydrogen form of crystalline faujasite "Y" zeolite comprising rare earths is the catalyst of choice. Not more than 20 weight percent and preferably not more than about 15 weight percent of the special crystalline zeolite is included in the matrix also providing catalytic cracking activity in the catalyst compositions. These catalyst compositions also contain some titanium oxide in the clay in a form considered not particularly active. The catalyst are prepared to provide rare earth metals rich in lanthanum to provide a La/Ce ratio of at least about 2.0. In addition the catalyst compositions are prepared to provide greater than about 0.40/g pore volume and comprise a pore size distribution greater than 400 Angstroms of at least 35 percent and a pore size distribution greater than 200 Angstroms of at least 50 percent. The crystalline zeolite component of the catalyst is prepared from a mixture of hydrogen stable faujasite zeolite and a rare earth exchanged faujasite zeolite or the rare earth components of the catalyst may be added during catalyst preparation to the hydrogen stable zeolite before or after distribution in the inorganic matrix material comprising the alumina above identified. Although not particularly identified in the above table, the catalyst compositions are prepared to provide an initial surface area in the range of 150 to 200 sq.m/g so that use and replacement of the catalyst as herein described will preferably maintain a catalyst equilibrium surface area of at least 80 sq.m/g during the accumulation up to about 5000 ppm may be tolerated without substantial adverse effects on product selectivity before effecting addition of antimony to passivate nickel. Thus, with some relatively clean residual oil feeds, total metals accumulation on the catalyst can bridge a time span of considerable magnitude when employing a catalyst replacement rate within the range of 0.5 to about 3 pounds per barrel of feed charged. The addition of metal passivating agents such as a compounds of antimony and titanium need not be initiated before considerable Ni and V accumulation is attained from the residual oil feed composition being charged as above identified.

The catalyst composition may include one or more combustion promoters which are useful in the subsequent step of regenerating the catalyst. Cracking of carbo-metallic oils results in substantial deposition of hydrocarbonaceous material often referred to just as coke on the catalyst, which coke reduces the activity of the catalyst. Thus, in order to restore the activity of the catalyst the coke is removed by combustion in a regeneration operation to form combustion product gases including carbon monoxide and/or carbon dioxide. Various substances are known which, when incorporated in cracking catalyst in small quantities, tend to promote conversion of the coke to carbon monoxide and particularly carbon dioxide. Such promoters include noble metals in small quantities as disclosed in the prior art.

Matrices with feeder pores having large minimum diameters and relatively large mouths to facilitate cracking and diffusion of high molecular weight molecules through the matrix to the portal surface area of molecular sieve particles within the matrix is most desirable. Such matrices preferably also have a relatively large pore volume in order to soak up and/or crack unvaporized portions of the carbo-metallic oil feed. Thus, significant numbers of liquid hydrocarbon molecules can diffuse to active catalytic sites both in the matrix and crystalline zeolite containing particles distributed in the matrix. In general, it is preferred to employ catalysts with matrices wherein the feeder pores have diameters in the range of about 400 to about 6000 Anstrom units, and preferably about 1000 to about 6000 Angstrom units.

Certain of the heavy metals accumulated on the catalyst are more active in promoting undesired reactions when they are in the form of elemental metal, than they are when in the oxidized form produced by contact with oxygen in the catalyst regenerator. The volume of material in the reaction zone resulting from the addition of diluent material such as steam, dry gas, naphtha and combinations thereof and conversion products increase the velocity of flow of the suspension through the reaction zone with a corresponding decrease in the residence time of the catalyst and oxidized heavy metals borne thereby. Because of this reduced residence time, it is suggested that there is less opportunity for reduction of the oxidized heavy metals to an elemental form to take place and therefore less of the harmful elemental metals are available for contacting the feed and products.

The dehydrogenation-condensation activity of catalyst accumulated heavy metals may also be inhibited by the presence of hydrogen sulfide into the reaction zone. Hydrogen may be made available for the deficient carbo-metallic oil feedstocks by introducing into the reaction zone either a conventional hydrogen donor diluent material such as product dry gas and wet gas, naphtha or relatively low molecular weight carbon-hydrogen fragment contributors, including for example: light olefins or paraffins; low molecular weight alcohols such as methanol and ethanol and other components which favor intermolecular hydrogen transfer in the hydrocarbon conversion zone.

In general, the hydrocarbon riser reactor configuration of this invention of smaller diameter in a bottom portion than an upper portion thereof is such as to provide a relatively high velocity flow of catalyst particles in fluidizing gas before contact with the hydrocarbon feed-diluent mixture to form a catalyst suspension therewith. For example, the velocity of the catalyst suspension in the lower portion of the riser will be of relatively high order of magnitude before contact with oil feed but less than about 100 feet per second. This suspension velocity is reduced in the upper larger diameter portion of the riser to less than 100 ft./sec. and may be as low as 50 to 80 ft./sec. The velocity capabilities of the catalyst suspension passing through the riser reactor with and without hydrocarbons will be sufficient to prevent formation of any significant dense fluid catalyst bed phase in a portion of the riser reactor. Therefore, the catalyst loading in the riser is varied substantially from about 10 to 20 pounds per cubic foot down to a concentration of about 2 to 5 pounds per cubic foot as influenced by the catalyst to oil ratio employed, the vapors formed and velocity of the suspension passed through the riser reaction zone.

It is preferred to restrict any substantial preheating of the feed to avoid coking thereof. The feed therefore is required to absorb a large amount of heat from the catalyst to raise the feed to a suitable converion temperature, thereby minimizing utilization of external fuels to heat the feedstock. Thus, where the nature of the feedstock permits, a preheat temperature of up to about 260° C. (500° F.), but more usually from about 93° C. to about 204° C. (200° F. to about 400° F.) is employed.

The regenerated catalyst charged to the riser reactor according to this invention is temperature restricted under the regeneration condition employed, for example, from about 718° C. (1325° F.) to about 815° C. (1500° F.), with from about 732° C. (1350° F.) to about 760° C. (1400° F.) being particularly preferred.

Although the pressure in the riser reactor may be restricted to a preferred pressure within the range of from about atmospheric pressure up to about 100 psig. In general, the partial pressure of the heavy oil feed may be maintained within a range of about 3 to about 15 psia, and more preferably from about 7 to about 10 psia. The feed partial pressure may be controlled by the introduction of diluent and viscosity reducing materials with the oil feed charged to the reactor by the use of wet gas recycle product, naphtha and other available product gasiform materials.

In general, the combination of catalyst to oil ratio, temperatures, pressures and residence times are selected to effect a substantial conversion of the carbo-metallic residual oil feedstock. One advantage of the process combination is that relatively high levels of conversion can be attained in a single pass. For example, the conversion may be in excess of 50% and may range to 80 to about 90%. Preferably, the hydrocarbon conversion conditions are maintained sufficient to attain conversion levels in the range of about 60 to about 80%.

The levels of conversion achievable according to this invention usually result in relatively large yields of coke, such as for example from about 4 to about 14% by weight based on fresh feed and more commonly from about 6 to about 12% by weight.

At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may also be as high as about 3%.

In accordance with the invention, the temperature of the catalyst particles during regeneration is controlled substantially by introducing liquid water into a first stage of catalyst regeneration. The water is introduced in the form of finely-divided droplets distributed across a lower bottom portion of the catalyst bed being contacted with an oxygen containing gas. The water may be introduced to the bed directly and separately or with the oxygen containing regeneration gas through suitable distributor means provided for the purpose. Preferably at least a portion of the water is dispersed in the oxidizing gas and carried with it into the catalyst bed in the regenerator. This is in contrast to the known prior art disclosed techniques in which water is introduced into the dilute or dispersed phase in a regenerator above a fluidized bed for the purpose of controlling and eliminating afterburining in withdrawn flue gases.

The substantial amount of carbonaceous materials deposited on the catalyst protects the catalyst in this first stage of catalyst regeneration in the presence of added water from deactivating the zeolite component with the steam formed. The liquid water is preferably introduced into the catalyst bed wherein the average concentration of a lean oxygen containing gas is the highest in accomplishing the substantial but partial combustion of hydrocarbonaceous deposits on the catalyst as herein discussed.

The tables below illustrate in one particular embodiment the amounts of water based on feed or air which maybe used to attain a selected heat balance for different amounts of coke production, concentration of hydrogen in the coke, and $CO_2$ to CO ratio in regeneration flue gases. Although these calculations ignore the heat losses of the regeneration equipment, such losses are normally small in practice and are usually disregarded.

TABLE 3

Oil inlet temperature = 93° C. (200° F.)
Air inlet temperature = 38° C. (100° F.)
Water temperature = 38° C. (100° F.)
Flue gases = 787° C. (1450° F.)
Reactor products = 538° C. (1000° F.)

| Percent Feed to Coke | Percent Hydrogen in Coke | $CO_2/CO$ | Pounds Water Per Pound Feed | Pounds Water Per Pound Air |
|---|---|---|---|---|
| 8 | 10 | 4 | 0.01 | 0.009 |
| 10 | 6 | 3 | 0.03 | 0.02 |
| 10 | 6 | 4 | 0.05 | 0.04 |
| 10 | 10 | 3 | 0.13 | 0.09 |
| 10 | 10 | 1 | 0.03 | 0.02 |
| 12 | 6 | 3 | 0.15 | 0.10 |
| 12 | 10 | 3 | 0.26 | 0.16 |
| 12 | 10 | 1 | 0.10 | 0.07 |
| 14 | r6 | 3 | 0.26 | 0.14 |
| 14 | 6 | 1 | 0.11 | 0.07 |

Table 4 below is similar to Table 3, differing only in that a feedstock preheat temperature of 232° C. (450° F.) is used instead of 93° C. (200° F.).

TABLE 4

Oil inlet temperature = 232° C. (450° F.)
Air inlet temperature = 38° C. (100° F.)
Water temperature = 38° C. (100° F.)
Flue gases = 787° C. (1450° F.)
Reactor products = 538° C. (1000° F.)

| Percent Feed to Coke | Percent Hydrogen in Coke | $CO_2/CO$ | Pounds Water Per Pound Feed | Pounds Water Per Pound Air |
|---|---|---|---|---|
| 8 | 10 | 4 | 0.13 | 0.11 |
| 10 | 6 | 3 | 0.15 | 0.12 |
| 12 | 6 | 3 | 0.27 | 0.15 |
| 14 | 6 | 3 | 0.38 | 0.21 |
| 10 | 10 | 1 | 0.15 | 0.12 |

The regenerating oxidizing gas may be any gas which can provide the desired oxygen requirements of the regeneration process to convert carbon to carbon oxides. The amount of combustion oxygen required per pound of coke for stoichiometric combustion depends upon the hydrogen content of the carbonaceous deposit and the desired flue gas $CO_2/CO$ ratio. The following table gives the weight of air required in pounds per pound of coke oxidized for the various levels of available hydrogen for combustion and $CO_2/CO$ flue gas ratios.

TABLE 5

| | Pounds of Air Required Per Pound of Coke | | | | |
|---|---|---|---|---|---|
| | $CO_2/CO$ Ratio | | | | |
| % Hydrogen | 100% $CO_2$ | 3/1 | 1/1 | 0.5/1 | 100% CO |
| 2 | 12.9 | 11.4 | 9.9 | 8.9 | 7.0 |
| 6 | 14.2 | 12.8 | 11.3 | 10.3 | 8.4 |
| 10 | 15.0 | 13.7 | 12.2 | 11.4 | 9.5 |

When regenerating catalyst to very low levels of carbon on regenerated catalyst, e.g. about 0.1% or less or about 0.05% or less, based on the weight of regenerated catalyst, it is contemplated removing residual carbon on partially regenerated catalyst up to 25 wt %. The total weight of deposited carbonaceous material on the catalyst is removed in at least two stages of regeneration in contact with combustion producing gases containing oxygen to a level less than 0.25 wt %. In this connection it is contemplated that a selected portion of the coke or carbonaceous deposits on the partially regenerated catalyst be removed with excess oxygen in a second stage of catalyst regeneration. By excess oxygen is meant an amount in excess of the stoichiometric requirement for burning substantially all of the carbon remaining on the partially regenerated catalyst as well as combustible components present. The $CO_2$ rich gaseous products of combustion attained in the presence of excess oxygen will include an amount of free unconsumed oxygen.

It is readily apparent that metals management, carbon management and heat management are inter-related subjects of the cracking operations for converting residual oils and reduced crudes. While a large coke yield and coke laydown on the catalyst results from relatively large quantities of coke precursors found in carbo-metallic heavy residual oils, the production of coke and dry gas is aggrevated by high metals accumulations on the catalyst which in turn significantly affect catalyst activity and selectivity performance. Moreover, the degree of success achieved with metals management and carbon management as herein identified has a direct influence on the extent of heat management necessary. Referring now to the drawing by way of example there if provided a riser contact zone of smaller diameter in a lower section 2 than in an upper section 4. A left gas is charged to the bottom of the riser by conduit 6 for admixture with regenerated catalyst charged thereto be conduit 8 at a desired elevated temperature. A high temperature relatively high velocity suspension of lift gas and high temperature regenerated catalyst particles pass upwardly through the bottom section 2 of the riser to an expanded transition section 10 and into the upper portion of the riser of larger diameter. The heavy oil feed to be processed by catalytic cracking is charged by conduit 12 to the transition section of admixture with the upflowing suspension of catalyst particles and lift gas at up to about 760° C. (1400° F.). A suitable heavy oil dispersant diluent material is added as desired by conduit 14 to the heavy oil feed to conduit 12 which mixture is added to the riser transition section through a plurality of feed inlet means penetrating the riser wall. The contact time of the introduced heavy oil feed and conversion product vapors in the downstream section 4 of the riser contact zone is restricted to a time frame within the range of about 1 to about 2.5 or 3 seconds. To achieve a vapor contact time within section 4 of the riser less than one second, it is contemplated charging the oil feed to a more down stream section of the riser by feed inlet means not shown. The suspension discharged from the riser section may be separated by any one of the techniques known and described in the prior art or by a technique known as ballistic separation. Vaporous product material separated from particles of catalyst at the riser discharge are passed through suitable cyclone separation equipment represented by cyclones 16 housed within an enlarged vessel means 18 in open communication with a lower cylindrical chamber 20 forming an annular stripping zone about riser section 4. Stripping gas is charged to a bottom portion of the stripping zone by conduit 22. Separated product vapors in the annular stripping zone are passed from a bottom portion thereof by conduit 26 to a fluid bed of catalyst particles 28 being regenerated in a first stage of catalyst regeneration in vessel 30. In a specific embodiment, the catalyst charged to bed 28 and comprising hydrocarbonaceous deposits is regenerated in an oxygen lean atmosphere providing a CO rich flue gas and under temperature conditions constrained not to substantially exceed about 732° C. (1350° F.) by the addition of liquid water directly to the fluid catalyst bed 28 either separately or with an oxygen deficient regeneration gas which will accomplish partial regeneration of the catalyst as desired and herein defined. In the arrangement of the drawing an oxygen deficient regeneration gas stream is introduced by conduit 32 to plenum chamber 34 communicating with a plurality of radiating regeneration gas distribution arms 36 for charging regeneration gas to a lower bottom portion of bed 28. Water is shown being added by conduit 38 to the regeneration gas in conduit 32. In regeneration vessel or zone 30, partial regeneration of the catalyst is accomplished to remove up to about 75% or more of the deposited hydrocarbonaceous deposits on the catalyst under temperature conditions restricted not to exceed about 732° C. (1350° F.) by water injection and use of an oxygen lean regeneration gas as herein discussed. CO rich flue gas, steam, sulfur, and nitrogen oxides and $CO_2$ pass through cyclone separators 40 for removal of entrained catalyst fines before the flue gases pass to plenum 42 for withdrawal by conduit 44. All or a portion of the partially regenerated catalyst in bed 28 is withdrawn downwardly for passage to cooler 48 to which boiler feed water is charged and steam is recovered therefrom whereby cooling of the partially regenerated catalyst is accomplished. The thus obtained lower temperature catalyst particles are recovered for passage to a second dense fluid bed of catalyst 50 being retained in a lower portion of regeneration vessel 52. Provision is also made for passing catalyst directly from bed 28 to bed 50 without cooling by conduit 54 as desired and required. An oxygen rich regeneration gas is charged by conduit 56 to the bottom portion of vessel 52 for flow through distribution grid means 58. The catalyst in bed 50 is regenerated under temperature conditions restricted not to exceed 760° C. (1400° F.) to complete the desired removal of residual carbon remaining on the catalyst particles as recovered from catalyst bed 28 of the first stage of regeneration. The regeneration temperature of catalyst in bed 50 is preferably restricted to within the range of about 732° C. (1350° F.) to about 760° C. (1400° F.) with an oxygen rich gas producing $CO_2$ rich flue gases. Thus, the temperature of catalyst generated in bed 50 is restricted in substantial measure by the temperature employed in bed 28 of the first stage of regeneration in cooperation with the heat removal by catalyst cooler 48. The hot flue gases of this second stage of catalyst regeneration at a temperature below 760° C. (1400° F.) and comprising $CO_2$ rich flue gas with some unconsumed oxygen passing through a perforated grid means 60 into a bottom portion of catalyst bed 28 in the first regeneration zone and beneath regeneration gas distributor arms 36 for flow upwardly through bed 28 and recovery with regeneration flue gases of said first stage of regeneration. The particles of catalyst regenerated in the sequence of regeneration zones above described provide catalyst particles at a desired elevated temperature above identified and comprising less than about 0.25 wt % of residual coke thereon which is withdrawn from an upper portion of bed 50 and passed by conduit 8 to the riser section 2 as above discussed.

In this catalyst regeneration system above described, the first temperature restricted regeneration operation is accomplished in a dense fluid bed of catalyst moving generally downward and countercurrent to rising oxygen lean gas and charged water. In the second stage of regeneration, the fluid bed of catalyst is shown flowing generally upward concurrent with rising oxygen rich regeneration gas. However, this may be reversed so that the bed 50 moves generally downward and countercurrent to rising regeneration gas by passing cooled catalyst from the bottom of cooler 48 by conduit 62 to an upper portion of bed 50 and withdrawing regenerated catalyst from the bottom of bed 50 by a suitable standpipe or withdrawal conduit communicating with a bottom portion of riser 2.

EXAMPLE

A carbo-metallic containing residual oil feed at a temperature of about 232° C. (450° F.) is introduced into a riser contact zone at a rate of about 2070 pounds per hour wherein it is mixed with regenerated catalyst particles at a temperature of about 690° C. (1275° F.). The catalyst to oil ratio by weight is about 11:1.

The carbo-metallic feed boiling above 343° F. (650° F.) comprises heavy metal contaminants of about 5 parts per million nickel equivalents, and a Conradson carbon content of about 7 percent.

Within the riser about 75 percent of the feed is converted to hydrocarbons boiling at a temperature less than 221° C. (430° F.) of which about 53 percent is gasoline. During the conversion about 11.2 percent of the feed is converted to coke containing 5.3 percent hydrogen.

The catalyst containing about one percent by weight of coke is removed from the reactor and introduced into a stripper where it is contacted with steam at a temperature of about 538° C. (1000° F.) to remove entrained vaporous material. The stripped catalyst is introduced into the upper regeneration zone of a twozone regenerator as shown in the figure at a rate of about 23,000 pounds per hour. Each zone in this specific example contains about 4000 pounds of catalyst. Air mixed with fine water droplets at a temperature of about 38° C. (100° F.) is introduced into the upper zone. The air flow rate is about 1200 pounds per hour and the water flow rate is about 450 pounds per hour. Air is introduced into the lower zone at a rate of about 1400 pounds per hour and a temperature of about 38° C. (100° F.).

The regeneration temperatures in this specific example in the upper zone and the lower zone are maintained between about 732° C. and 760° C. (1350° F. and 1400° F.) respectively. The catalyst transferred from the upper zone to the lower zone contains greater than 0.25 percent residual coke by weight and the catalyst removed from the lower zone and recycled to the reactor riser contains about 0.03 percent coke by weight.

Having thus generally described the method and concepts of this invention and discussed specific examples in support thereof, it is to be understood that no undue restrictions are to be imposed by reasons thereof except as defined by the following claims. References cited herein, and literature they mention, are hereby incorporated by reference.

What is claimed is:

1. A method for regenerating particles of catalyst comprising hydrocarbonaceous deposits and metal contaminants of heavy residual oil catalytic conversion comprising Conradson carbon producing components which comprises,
   (a) initially regenerating said catalyst particles comprising hydrocarbonaceous deposits in an oxygen lean atmosphere producing CO rich flue gases whereby a major portion of said hydrocarbonaceous deposits are removed by combustion,
   (b) restricting the regeneration temperature during said initial regeneration step not to substantially exceed about 704° C. (1300° F.) by adding liquid water thereto adjacent the inlet of oxygen containing gas,
   (c) recovering partially regenerated catalyst particles from said initial stage of regeneration and further indirectly cooling said catalyst under conditions to form steam,
   (d) passing the indirectly cooled catalyst directly to a second stage of catalyst regeneration maintained at a temperature not to exceed said initial regeneration temperature by more than 10° to 38° C. (50° to 100° F.) during combustion of residual carbonaceous material with an oxygen rich regeneration gas free of moisture to form $CO_2$ rich flue gases comprising unconsumed oxygen,
   (e) passing the $CO_2$ rich flue gas directly from said second stage regeneration into contact with catalyst in said initial regeneration step, and
   (f) recovering catalyst particles from said second stage comprising residual carbon thereon at a temperature suitable for effecting catalytic conversion of said heavy residual oil feed.

2. The regeneration operation of claim 1 wherein the catalyst comprises less than 20 weight percent of crystllaine zeolite dispersed in a matrix comprising an abundance of alumina and providing cracking activity, said catalyst further characterized as comprising a high lanthanum to cerium ratio at least in the matrix thereof.

3. A method for converting residual portions of crude oils of an API gravity within the range of 10 to 35 having an end boiling point above 552° C. (1025° F.) and comprising metal contaminants which comprises,
   (a) contacting said residual portion of a crude oil with a cracking catalyst particle composition comprising a mixture of rare earth exchanged and ultrastable faujasite crystalline zeolite distributed in a catalytically active matrix comprising alumina in a riser conversion zone under temperature conditions providing a hydrocarbon conversion product vapor at a temperature within the range of 510° C. to 566° C. (950° F. to 1050° F.) whereby hydrocarbonaceous material is deposited on the catalyst particles,
   (b) passing catalyst particles comprising hydrocarbonaceous deposits to a first stage of dense fluid bed catalyst particle regeneration,
   (c) said first stage of catalyst regenerating effected under conditions to produce CO rich flue gases and steam during combustion removal of substantial hydrocarbonaceous deposits at a temperature restricted not to exceed 704° C. (1300° F.) during direct injection of water and oxygen lean combustion gas into a lower bottom portion of said dense fluid bed of catalyst,
   (d) recovering partially regenerated catalyst from said first stage of regeneration comprising substantial residual carbonaceous deposits, cooling said recovered partially regenerated catalyst before passage to a second dense fluid bed of catalyst in a second stage of catalyst regeneration,
   (e) regenerating the catalyst in the second stage at a temperature limited not to exceed about 760° C. (1400° F.) and produce carbon dioxide rich flue gases comprising unconsumed oxygen whereby the regenerated catalyst particles comprise up to 0.25 weight percent of residual coke,
   (f) passing oxygen containing carbon dioxide rich flue gas of said second stage of regeneration directly into the bottom of said catalyst bed in said first stage of regeneration, and
   (g) passing regenerated catalyst obtained as above recited to said residual oil cracking operation.

4. The method of claim 3 wherein said fluid bed of catalyst in said first regeneration zone moves generally downward and the fluid bed of catalyst in the second regeneration zone moves generally upward.

5. The method of claim 3 wherein the fluid bed of catalyst in the first regeneration zone moves generally upward and the fluid bed of catalyst in the second regeneration zone moves generally upward or downward.

6. The method of claim 3 wherein regenerated catalyst is returned is said riser conversion zone, said catalyst returned to said riser zone is passed in fluidizing gas upwardly through a lower portion thereof before being contacted with the oil feed in an upper larger diameter portion of the riser and of a length to provide an upflowing hydrocarbon vapor-catalyst suspension residence time therein less than 3 seconds.

7. In a process for converting residual oils comprising Conradson carbon and metal contaminants with a crytalline zeolite containing cracking catalyst to form gasoline, lowe and higher boiling liquid products, the improved method of operation which comprises,
   (a) effecting conversion of a residual oil feed with a low coke producing catalyst at a cat./oil ratio less than 10 and a temperature not substantially above about 732° C. (1350° F.) whereby hydrocarbonaceous materials and metal contaminants are deposited on the catalyst particles during formation of vaporous hydrocarbon conversion products,
   (b) said catalyst comprising a minor amount of an ultrastable form of "Y" faujasite crystalline zeolite dispersed in a siliceous matrix composition comprising an abundance of alumina and said catalyst provided with a lanthanum to cerium ratio greater than 1/1,
(c) recovering catalyst of said hydrocarbon conversion comprising hydrocarbonaceous deposits and metal contaminants,
(d) regenerating said catalyst in a sequence of catalyst regeneration zone comprising an oxygen lean atmosphere in a first zone and an oxygen rich atmosphere in a second zone under selected temperature conditions restricted in the first zone by the direct addition of water to the catalyst being partially regenerated therein and by further indirectly cooling the partially regenerated catalyst passed from the first regeneration zone to the second regeneration zone whereby the catalyst temperature in the second zone is restricted from exceeding a temperature of about 760° C. (1400° F.),
(e) passivating accumulated Ni and V metal contaminants on the catalyst by the addition of titanium and antimony thereto, and
(f) restricting the accumulation of nickel plus vanadium on the catalyst not to exceed from about 6000 up to 7500 ppm by replacing metal contaminated catalyst with fresher catalyst at a replacement rate within the range of 0.5 to 3 pounds per barrel of residual oil feed,
wherein a major portion of deposited hydrocarbonaceous material is removed from the catalyst in said first stage of catalyst regeneration at a temperature not substantially exceeding 704° C. (1300° F.) with charged lean oxygen containing gas comprising liquid droplets of water and wherein catalyst particles withdrawn from said first stage of regeneration are indirectly cooled in an external cooler to a lower temperature before being charged to said second stage of regeneration, said catalyst charged to said second stage of regeneration being contacted with oxygen rich gas in an amount sufficient to reduce residual coke on said catalyst to less than 0.25 weight percent under temperature conditions restricted to an upper limit of from 732° C. (1350° F.) to about 760° C. (1400° F.) and produce $CO_2$ rich flue gas comprising unconsumed oxygen, and passing flue gas from an upper dispersed catalyst phase portion of said second stage of regeneration with entrained particles of catalyst directly into a bottom portion of said dense fluid bed of catalyst maintained in said first stage of catalyst regeneration.

* * * * *